(12) United States Patent
Sheikholeslami (10) Patent No.: US 9,787,088 B2
(45) Date of Patent: Oct. 10, 2017

(54) OVERVOLTAGE PROTECTION FOR NFC DEVICES

(71) Applicant: Qualcomm Technologies International, Ltd., Cambridge (GB)

(72) Inventor: Behzad Sheikholeslami, Waterbeach (GB)

(73) Assignee: QUALCOMM TECHNOLOGIES INTERNATIONAL, LTD. (GB)

( * ) Notice: Subject to any disclaimer, the term of this patent is extended or adjusted under 35 U.S.C. 154(b) by 434 days.

(21) Appl. No.: 14/490,790

(22) Filed: Sep. 19, 2014

(65) Prior Publication Data
US 2016/0087430 A1    Mar. 24, 2016

(51) Int. Cl.
*H02H 9/04* (2006.01)
*H02J 5/00* (2016.01)
*H02J 7/02* (2016.01)
*H04B 5/00* (2006.01)

(52) U.S. Cl.
CPC ............. *H02H 9/042* (2013.01); *H02J 5/005* (2013.01); *H02J 7/025* (2013.01); *H04B 5/0025* (2013.01); *H04B 5/0037* (2013.01); *H04B 5/0075* (2013.01)

(58) Field of Classification Search
CPC .......... H02J 9/042; H02J 5/005; H02J 7/025; H04B 5/0037; H04B 5/0075; H04B 5/0025
See application file for complete search history.

(56) References Cited

U.S. PATENT DOCUMENTS

| | | | |
|---|---|---|---|
| 6,167,236 A | 12/2000 | Kaiser et al. | |
| 2005/0122644 A1* | 6/2005 | Ma | H01L 27/0259 361/56 |
| 2007/0075147 A1 | 4/2007 | Ng | |
| 2014/0246493 A1 | 9/2014 | Agrawal et al. | |

FOREIGN PATENT DOCUMENTS

GB    2479792 A    10/2011

OTHER PUBLICATIONS

Partial International Search Report—PCT/US2015/050623—ISA/EPO—Dec. 8, 2015.
International Search Report and Written Opinion—PCT/US2015/050623—ISA/EPO—Feb. 16, 2016.

* cited by examiner

Primary Examiner — Zeev V Kitov (57) ABSTRACT

The present application relates to a near field communication (NFC) device which has an antenna for receiving NFC signals. The NFC device includes a protection system for protecting a transmit/receive system, and other systems, of the NFC device from potentially damaging voltages that may develop at an output of the antenna if the device enters a strong magnetic field. The protection system includes current control devices that are operative to source or sink current depending upon the polarity of a signal at an output of the antenna, to generate a voltage which at least partially negates a positive or negative voltage at the output of the antenna, thereby reducing the peak voltage at the antenna output.

13 Claims, 5 Drawing Sheets

OVERVOLTAGE PROTECTION FOR NFC DEVICES

TECHNICAL FIELD

The present invention relates to the technical field of near field communication (NFC) devices, and in particular to the protection of components and systems in NFC devices from damaging voltages.

BACKGROUND TO THE INVENTION

Near field communication (NFC) systems are used for short-range communications between an NFC transmitter device, commonly referred to as an NFC reader, and a powered or unpowered NFC receiver device, commonly referred to as a tag. The NFC reader generates a short range magnetic field which couples with an antenna in the NFC tag, and data can be transmitted between the NFC reader and the NFC tag by modulation of this magnetic field. To this end, the NFC tag typically includes transmit/receive circuitry in addition to the antenna.

When an NFC receiver device such as a tag enters a magnetic field, a voltage is generated at the output of the antenna of the tag. The magnitude of this voltage is dependent upon a number of factors, including the strength of the magnetic field, the distance between the source of the magnetic field and the tag, the type of antenna in the tag, and any antenna interface circuitry present in the tag.

The transmit/receive circuitry in the tag can only tolerate a limited positive or negative voltage at its input ports before damage occurs. In normal operation of an NFC tag (for example when the tag is used to receive and respond to a signal from an NFC reader) this may not be a particular problem, but when the tag enters a strong magnetic field, such as may occur in the vicinity of a wireless charger system, there is a risk that the transmit/receive circuitry of the tag could be damaged by high positive or negative voltages that may develop at the output of the tag antenna as a result of the strong magnetic field.

Accordingly, a need exists for a mechanism to protect transmit/receive and other circuitry in an NFC device such as an NFC tag from potentially damaging voltages that may develop when the NFC device enters or is present in a strong magnetic field.

SUMMARY OF INVENTION

According to a first aspect of the present invention there is provided a near field communications (NFC) device comprising: an antenna; a communications circuit; and a protection circuit coupled to the antenna, the protection circuit for protecting the communications circuit from damaging voltages output by the antenna, wherein the protection circuit comprises: first and second current control means; and a controller for outputting a control signal for controlling the first and second current control means, the protection circuit being operative to source or sink current according to a polarity of a voltage that is present at an output of the antenna so as to generate a voltage which reduces the peak voltage present at the output of the antenna.

The NFC device of the first aspect includes a protection system that is operative to protect the communications circuit from potentially damaging high peak positive or negative voltages, as the first and second current control means either source or sink current, depending upon the polarity of a signal at an output of the antenna, to generate a positive or negative voltage that reduces the peak voltage present at the antenna output, thereby reducing the peak voltage to which the communications circuit is subjected.

The controller may comprise a servo loop.

The servo loop may be operative to compare a peak voltage at an output of the antenna with a desired peak output voltage and to generate a control signal for controlling the first and second current control means so as to achieve the desired peak output voltage.

Alternatively, the controller may comprise a plurality of diodes connected to a control input of each of the first and second current control means.

The controller may further comprise a switch device operative to control current flow through the plurality of diodes.

The plurality of diodes may be reverse biased when the NFC device is powered. The first and second current control means may comprise transistors.

The transistors may be N-channel MOSFETs, for example.

Gate terminals of the N-channel MOSFETs may be coupled to each other and to the output of the controller.

Source terminals of the N-channel MOSFETs may be coupled to each other.

The drain terminal of the first N-channel MOSFET may be coupled to one terminal of the antenna and the drain terminal of the second N-channel MOSFET may be coupled to another terminal of the antenna.

According to a second aspect of the invention there is provided a near field communications (NFC) device comprising: an antenna; a communications circuit; and a load modulation circuit coupled to the antenna, wherein the load modulation circuit comprises: first and second current control means; and a controller for outputting a control signal for controlling the first and second current control means, the load modulation circuit being operative to adjust the amplitude of a signal at an input to the antenna in accordance with the control signal output by the controller.

The first and second current control means may comprise transistors.

The transistors may be N-channel MOSFETs, for example.

Gate terminals of the N-channel MOSFETs may be coupled to each other and to the output of the controller.

Source terminals of the N-channel MOSFETs may be coupled to each other.

The drain terminal of the first N-channel MOSFET may be coupled to one terminal of the antenna and the drain terminal of the second N-channel MOSFET may be coupled to another terminal of the antenna.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
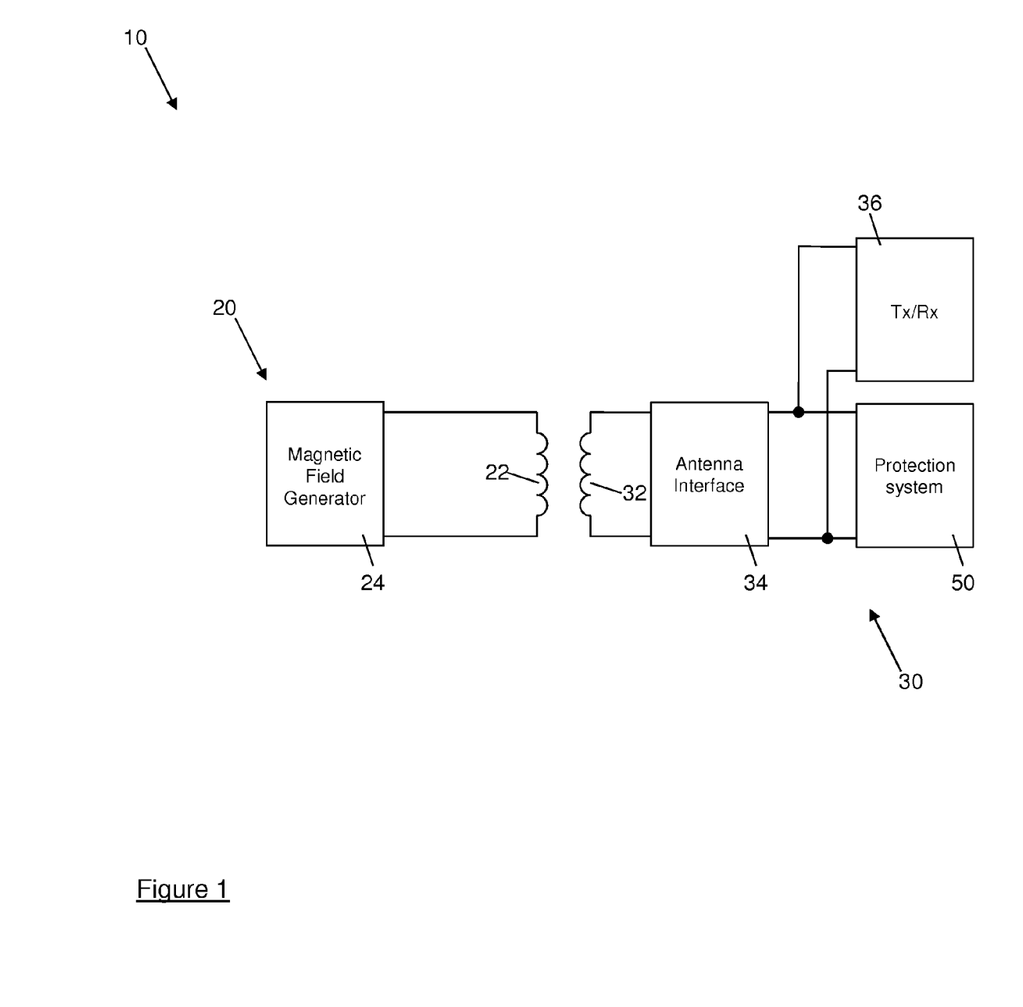
FIG. 1 is a schematic representation of a near field communication (NFC) system.

Referring first to FIG. 1, a near field communication (NFC) system is shown generally at 10, and includes a magnetic field generating device 20 and an NFC receiver device 30.

The magnetic field generating device 20 may be, for example, an NFC reader or a wireless charger, and includes a magnetic field generator 24 connected to an antenna 22 in the form of a coil of conductive material such as wire or the like.

The NFC receiver device 30 may be, for example, an NFC tag. The NFC reader device 30 includes an antenna 32, again in the form of a coil of a conductor such as wire or the like. The antenna 32 is connected to an antenna interface 34 which couples the antenna 32 to a transmit/receive system 36.

The antenna interface 34 is also connected to a protection system 50, which is connected in parallel with the transmit/receive system 36 and is operative to protect the transmit/receive system 36 (and other circuitry that may be included in the NFC receiver device 30) from potentially harmful voltages that may be generated by the antenna when the NFC receiver device 30 is present within a strong magnetic field, by reducing the peak voltage appearing at the output of antenna interface 34, as will be described below.

Figure 2:
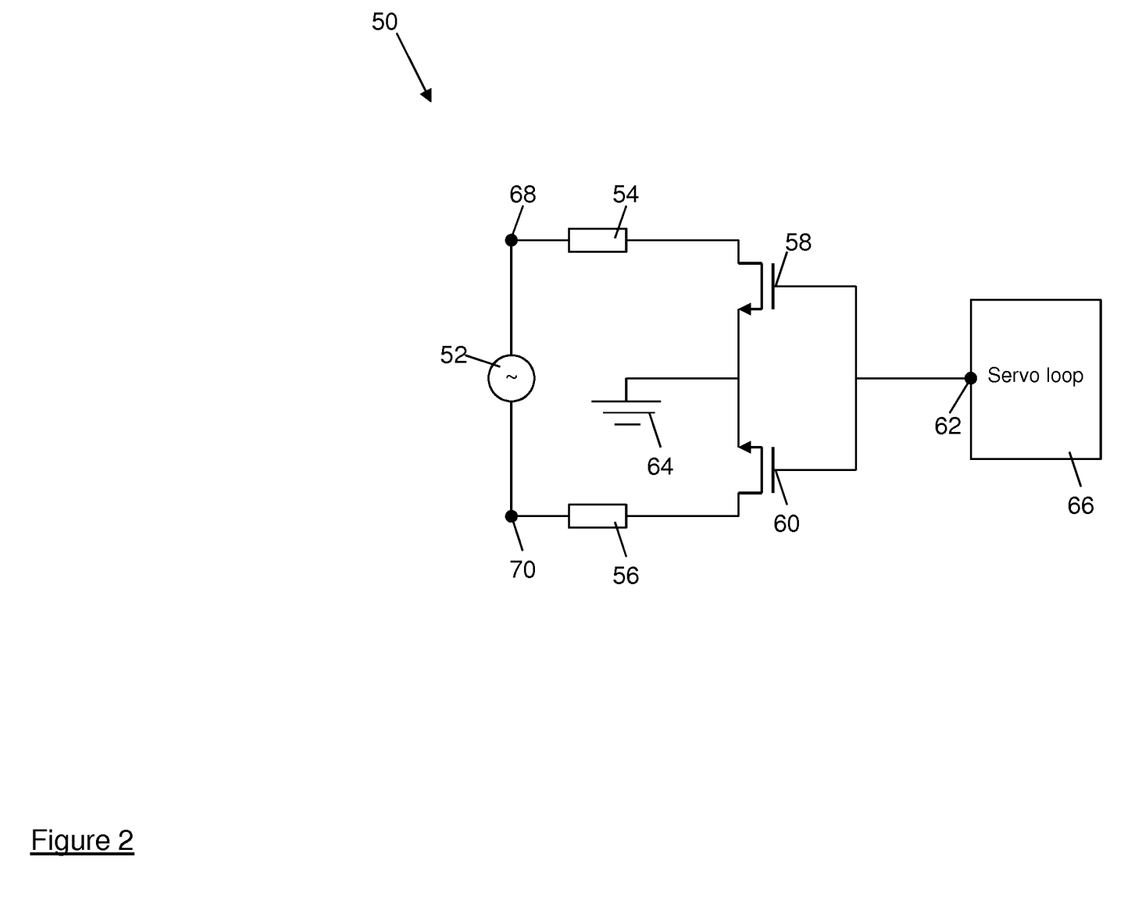
FIG. 2 is a schematic representation of an equivalent circuit of a protection system for an NFC device such as an NFC tag.

FIG. 2 is a schematic diagram showing an equivalent circuit representing the protection system 50. In the diagram of FIG. 2, a signal generator 52 represents the output of the antenna interface 34, whilst resistances 54, 56 represent the impedance of the antenna 32.

The protection system 50 includes first and second current control devices. In the example illustrated in FIG. 2, the current control devices take the form of first and second N-channel MOSFET transistors 58, 60, but it will be appreciated that any other suitable type of current control device, such as bipolar junction transistor devices, could also be used. The first and second N-channel MOSFET transistors 58, 60 are identical devices, which helps to minimise the circuit area occupied by the protection system 50 when implemented in an integrated circuit.

The gate terminal of the first transistor 58 is connected to the gate terminal of the second transistor 60, and the gate terminals of the first and second transistors 58, 60 are connected to a common control input 62. In one embodiment, a control signal is provided by a servo loop 66 connected to the common control input 62. In other embodiments (described in detail below) a control signal is provided by an alternative dedicated control system.

The source terminal of the first transistor 58 is connected to the source terminal of the second transistor 60, and the source terminals of the first and second transistors 58, 60 are both connected to ground 64.

The drain terminal of the first transistor 58 is connected to a positive output terminal 68 of the antenna interface 34 (represented in the equivalent circuit of FIG. 2 by signal generator 52), whilst the drain terminal of the second transistor 60 is connected to a negative output terminal 70 of the antenna interface 34.

The operation of the protection system 50 will now be described with reference to FIGS. 3a to 3d.

As indicated above, a control signal is provided by a servo loop 66 having an output which is connected to the common control input 62. The servo loop 66 may be analogue or may be mixed signal (i.e. a combination of analogue and digital circuitry), and is configured to sense the peak voltage (positive or negative) at the output terminals 68, 70 of the antenna interface 34, and to compare the sensed peak voltage to a desired level at which the peak voltage will not be harmful to the transmit/receive system 36. Based on this comparison, the servo loop 66 outputs a control signal to the control input 62 to bias the transistors 58, 60 at a level at which the desired peak output voltage of the antenna interface 34 will be achieved.

Figure 3A:
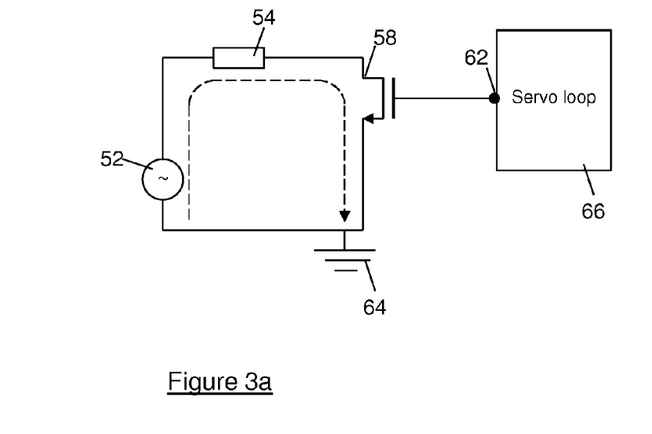
FIGS. 3a-3d are schematic representations used to illustrate the operation of the protection system of FIG. 2.

When the output of the antenna interface 34 at the positive output terminal 68 is positive, the situation illustrated in FIG. 3a persists. In this situation, the first transistor 58 is switched on and current flows from the output of the antenna interface 34 (represented in the equivalent circuit of FIG. 3a by signal generator 52) through the first transistor 58 to ground 64, as shown by the dashed arrow. Thus, the first transistor 58 in this situation acts as a current sink. The effect of this current flow passing through the resistance 54 is that a negative voltage develops across the antenna 32, which partially negates the peak positive voltage developed across the antenna 32 as a result of the magnetic field, and thus reduces the peak positive voltage at the output of the antenna interface 34, thereby reducing the risk of a damaging overvoltage condition at the transmit/receive system 36.

Figure 3B:
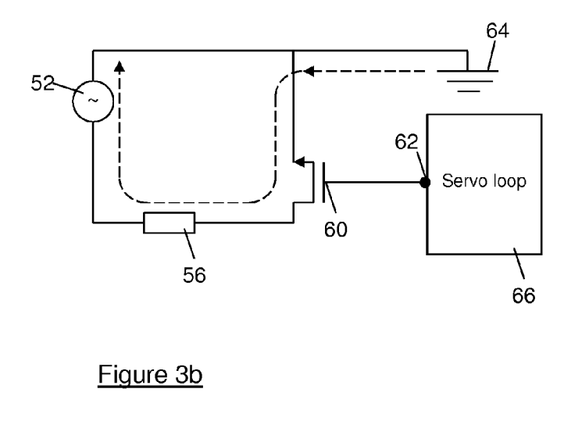

When the output of the antenna interface 34 at the negative output terminal 70 is negative, the situation illustrated in FIG. 3b persists. In this situation, the second transistor 60 is switched on and current flows from ground 64 through the second transistor 60 to the output of the antenna interface 34 (represented in the equivalent circuit of FIG. 3b by signal generator 52), as shown by the dashed arrow. Thus, the second transistor 60 in this situation acts as a current source. The effect of this current flow passing through the antenna impedance 56 is that a positive voltage develops across the antenna 32, which partially negates the peak negative voltage developed across the antenna 32 as a result of the magnetic field, and thus reduces the peak negative voltage at the output of the antenna interface 34, thereby reducing the risk of a damaging overvoltage condition at the transmit/receive system 36.

Figure 3C:
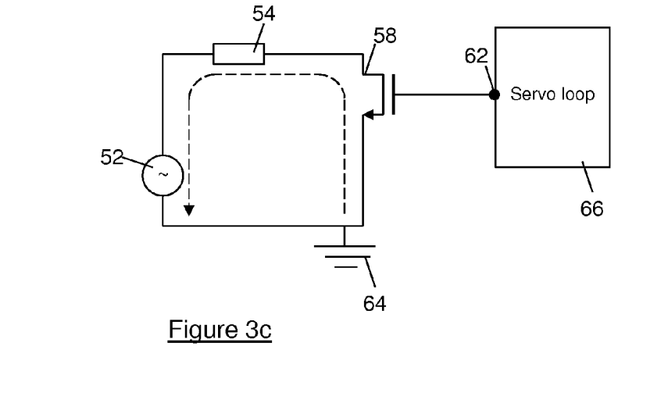

When the output of the antenna interface 34 at the positive output terminal 68 is negative, the situation illustrated in FIG. 3c persists. In this situation, the first transistor 58 is switched on and current flows from ground 64 through the first transistor 58 to the output of the antenna interface 34 (represented in the equivalent circuit of FIG. 3c by signal generator 52), in the direction of the dashed arrow. Thus, the first transistor 58 in this situation acts as a current source. The effect of this current flow passing through the resistance 54 is that a positive voltage develops across the antenna 32, which partially negates the peak negative voltage developed across the antenna 32 as a result of the magnetic field, and thus reduces the peak negative voltage at the output of the antenna interface 34, thereby reducing the risk of a damaging overvoltage condition at the transmit/receive system 36.

Figure 3D:
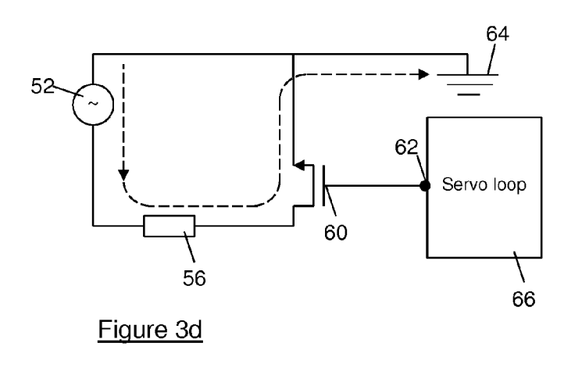

When the output of the antenna interface 34 at the negative output terminal 70 is positive, the situation illustrated in FIG. 3d persists. In this situation, the second transistor 60 is switched on and current flows from the output of the antenna interface 34 (represented in the equivalent circuit of FIG. 3d by signal generator 52) through the second transistor 60 to ground 64, as shown by the dashed arrow. Thus, the second transistor 60 in this situation acts as a current sink. The effect of this current flow passing through the antenna impedance 56 is that a negative voltage develops across the antenna 32, which partially negates the peak positive voltage developed across the antenna 32 as a result of the magnetic field, and thus reduces the peak positive voltage at the output of the antenna interface 34, thereby reducing the risk of a damaging overvoltage condition at the transmit/receive system 36.

As will be appreciated, the protection system 50 protects the transmit/receive system 34 from potentially damaging positive and negative overvoltage conditions by reducing the peak positive and negative voltages at the output of the antenna interface 34.

It will be appreciated that the protection system described above and illustrated in FIGS. 2 and 3a-3d relies on the control signal provided by the servo loop 66 connected to the common control input 62, and thus in order for the protection system to be operational the NFC receiver device 30 must be powered, to permit the servo loop 66 to generate the control signal. However, it is possible that the NFC receiver device could enter a strong magnetic field when it is not powered, and thus the transmit/receive system 36 may be subject to potentially damaging peak voltages when the protection system 50 is not operative.

Figure 4:
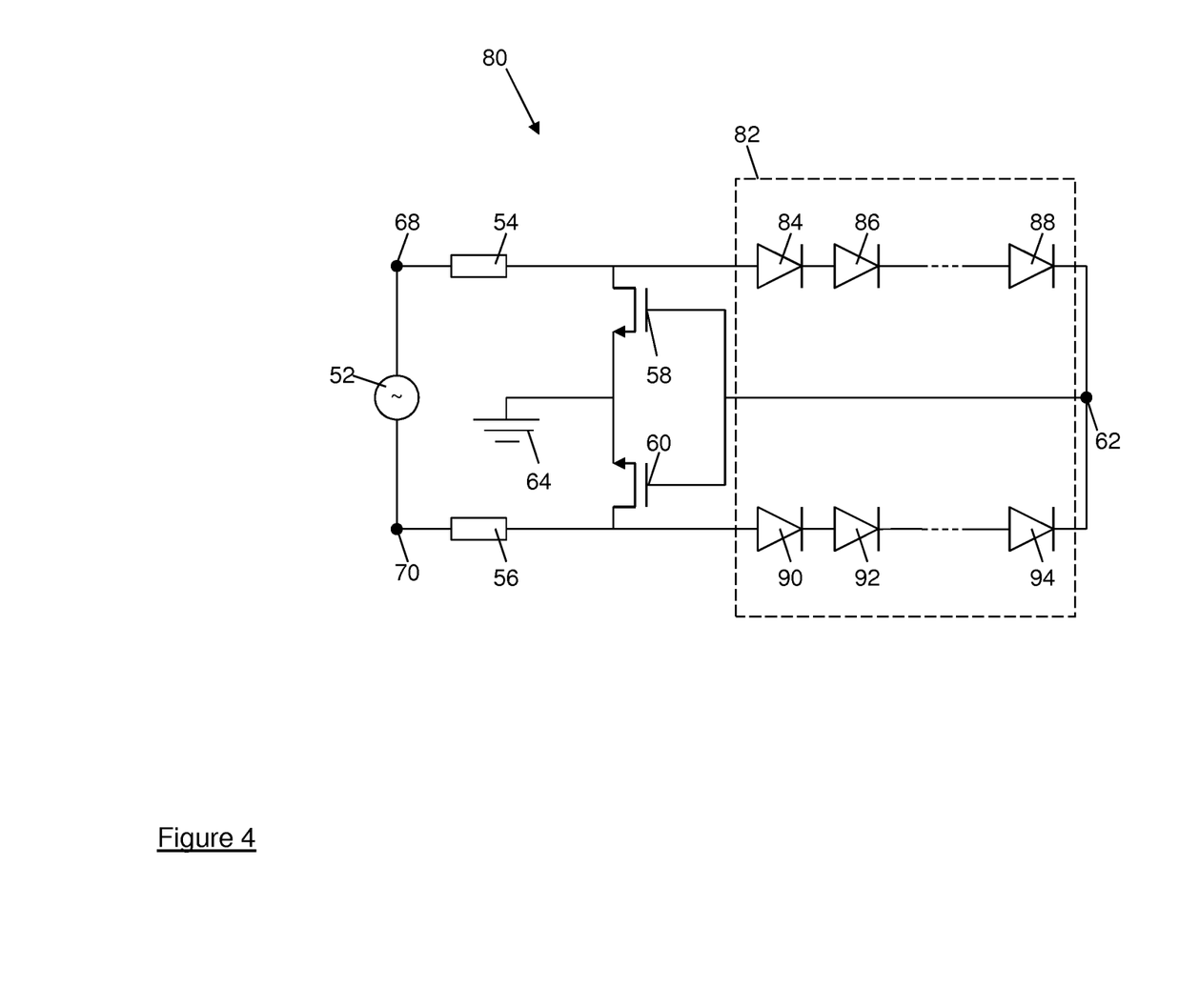
FIG. 4 is a schematic representation of an equivalent circuit of a further protection system for an NFC device such as an NFC tag.

FIG. 4 is a schematic representation showing an equivalent circuit of an alternative protection system that can be operational when the NFC receiver device 30 is not powered. The systems shown in FIG. 3 and FIG. 4 have some common elements, and so like reference numerals in FIGS. 3 and 4 refer to like elements.

The protection system 80 shown in FIG. 4 is based on that shown in FIG. 2, and thus includes the first and second current control devices. As before, in the example illustrated in FIG. 4, the current control devices take the form of first and second N-channel MOSFET transistors 58, 60, but it will be appreciated that any other suitable type of current control device, such as bipolar junction devices, could also be used. Again, the first and second N-channel MOSFET transistors 58, 60 are identical devices.

The gate terminal of the first transistor 58 is connected to the gate terminal of the second transistor 60, and the gate terminals of the first and second transistors 58, 60 are connected to a common control input 62.

The source terminal of the first transistor 58 is connected to the source terminal of the second transistor 60, and the source terminals of the first and second transistors 58, 60 are both connected to ground 64.

The drain terminal of the first transistor 58 is connected to a positive output terminal 68 of the antenna interface 34 (represented in the equivalent circuit of FIG. 4 by signal generator 52), whilst the drain terminal of the second transistor 60 is connected to a negative output terminal 70 of the antenna interface 34.

Where the system 80 illustrated in FIG. 4 differs from the system 50 of FIG. 2 is that the servo loop 66 of the system 50 is replaced in the system 80 of FIG. 4 by a dedicated control circuit 82.

The control circuit 82 is made up of a first set of diodes 84, 86, 88 connected in series between the drain terminal of the first transistor 58 and the common control input 62 (with the anode of the first diode in the series being connected to the drain terminal of the first transistor 58 and the cathode of the last diode in the series being connected to the common control input) and a second set of diodes 90, 92, 94 connected in series between the drain terminal of the second transistor and the common control input 62 (again with the anode of the first diode in the series being connected to the drain terminal of the second transistor 60 and the cathode of the last diode in the series being connected to the common control input). Although in the system 80 illustrated in FIG. 4 the first set of diodes contains three diodes 84, 86, 88, it will be appreciated that any number of diodes may be used. Additionally, resistors or capacitors could be added in series with the diodes to protect them from high levels of current. Similarly, although the second set of diodes is shown in FIG. 4 as containing three diodes, it will be appreciated that any number of diodes may be used, with additional series resistors or capacitors if required to protect the diodes from high currents. For simplicity of design and implementation, it is advantageous if all of the diodes 84, 86, 88, 90, 92, 94 in the first and second sets are identical in terms of their specification, operating parameters etc.

In operation of the system of FIG. 4, one of the first and second set of diodes will be forward biased, depending upon the polarity of the signal output by the antenna interface 34 (represented in the equivalent circuit of FIG. 4 by signal generator 52), thus providing a positive voltage to the gate terminals of each of the first and second transistors 58, 60 to permit current to be sourced or sunk by the protection system 80 to reduce the peak voltage at the output of the antenna interface 34, thereby protecting the transmit/receive system 36 from potentially overvoltage conditions.

For example, if the voltage at the positive output 68 of the antenna interface 34 is positive, the first set of diodes 84, 86, 88 will be forward biased, thereby providing a positive voltage to the gates of the first and second transistors 58, 60 and permitting the protection system 80 to sink current to reduce the peak voltage output by the antenna interface 34.

Similarly, if the voltage at the negative output 70 of the antenna interface 34 is positive, the second set of diodes 90, 92, 94 will be forward biased, thereby providing a positive voltage to the gates of the first and second transistors 58, 60 and permitting the protection system 80 to sink current to reduce the peak voltage output by the antenna interface 34.

The control circuit 82 can be used in conjunction with the servo loop 66 to provide overvoltage protection for the transmit/receive system 36 both when the NFC receiver device 30 is powered and when the NFC receiver device 30 is unpowered. In this situation, the transmit/receive system 36 will provide the control signal to the common control input 62 when the NFC receiver is powered, whilst the control circuit 82 provides the control signal to the common control input when the NFC receiver device 30 is unpowered.

In the mode of operation illustrated in FIG. 4, the system 80 does not draw any current from a battery, but relies instead on power harvested from the magnetic field using the diodes. The addition of a large value capacitor at the common control input 62 permits energy to be harvested and stored for use by other parts of the device in which the system 80 is used.

In normal operation (i.e. when the NFC receiver device 30 is powered and the control signal is applied by the transmit/receive system 36), the first and second sets of diodes 84, 86, 88, 90, 92, 94 should be reverse biased, to prevent the control signal output by the servo loop 66 from being transmitted to the antenna interface 34. To ensure this is the case, the following relationship should be observed in normal operation:

$$V_{peak\_desired} - V_{g\_desired} < n*V_{diodeON},$$

where $V_{peak\_desired}$ is the desired positive peak voltage at the output of the antenna interface 34, $V_{g\_desired}$ is the gate voltage which generates $V_{peak\_desired}$, $V_{diodeON}$ is the switch on voltage of the diodes 84, 86, 88, 90, 92, 94 and n is the number of diodes connected in series in the first or second set of diodes.

If for any reason it is not possible to observe the above relationship, a modification may be made to the protection system 80, as will now be described with reference to FIG. 5.

Figure 5:
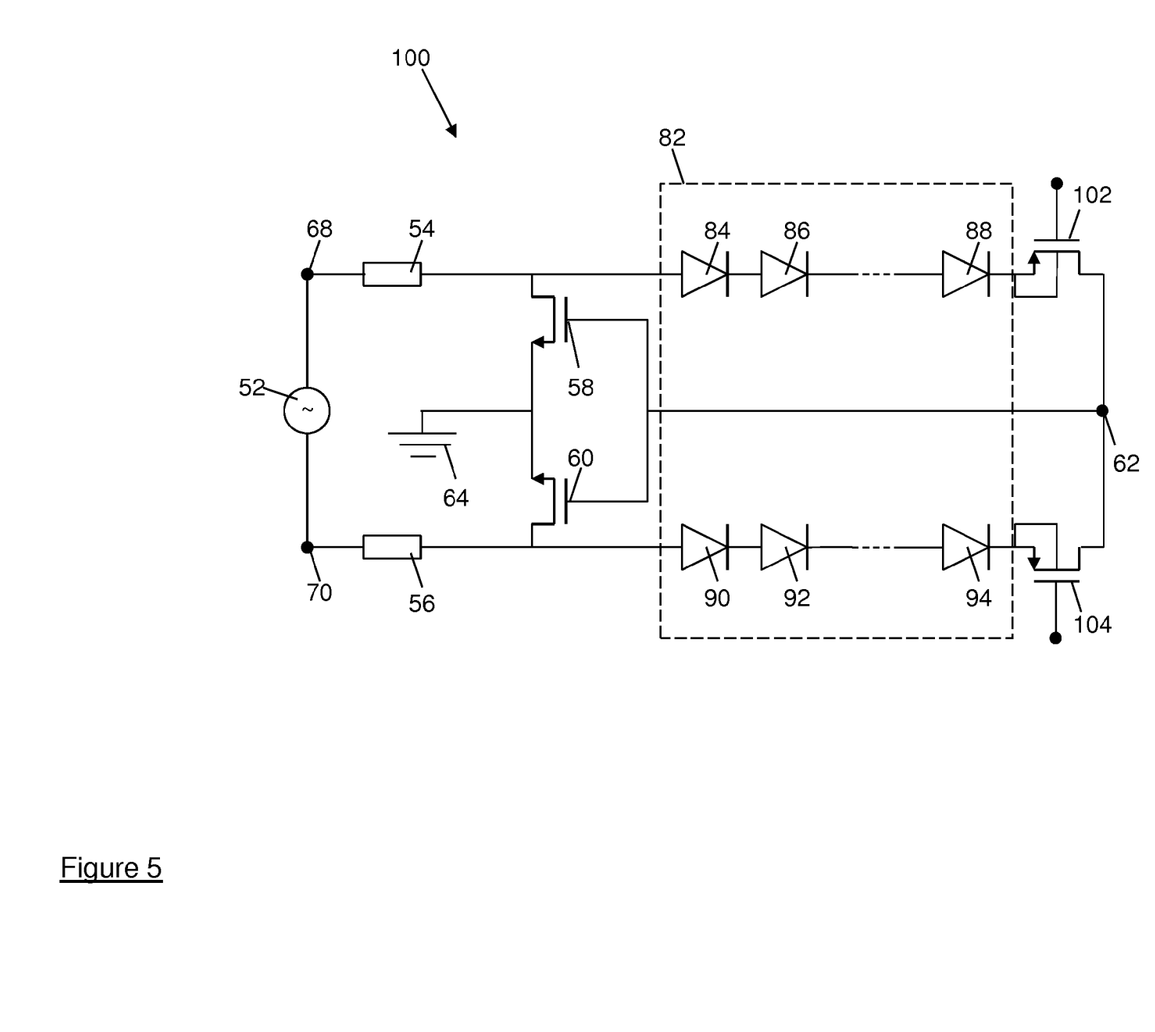
FIG. 5 is a schematic representation of an equivalent circuit of a further protection system for an NFC device such as an NFC tag.

FIG. 5 is a schematic representation showing an equivalent circuit of a further alternative protection system that can be operational to provide overvoltage protection both when the NFC receiver device 30 is powered and when it is powered. Again, the systems shown in FIGS. 3, 4 and 5 have some common elements, and so like reference numerals in FIGS. 3, 4 and 5 refer to like elements.

The protection system 100 illustrated in FIG. 5 is similar to that of FIG. 4, and thus for the sake of brevity the elements that are common to the protection system 100 of FIG. 5 and the protection system 80 of FIG. 4 will not be described again here.

The protection system 100 of FIG. 5 differs from the protection system 80 of FIG. 4 in that it includes first and second switch devices 102, 104. In the example illustrated in FIG. 5, the first and second switch devices 102, 104 are P-channel MOSFET transistor devices, but it will be appreciated that other types of switch device may equally be employed.

The source terminal of the first switch device 102 is connected to the cathode of the last diode 88 in the first set, whilst the drain terminal of the first switch device 102 is connected to the common control input 62. The gate terminal of the first switch device 102 receives a control input from an external source, to control the operation of the first switch device 102.

Similarly, the source terminal of the second switch device 104 is connected to the cathode of the last diode 94 in the second set, whilst the drain terminal of the second switch device 104 is connected to the common control input 62. The gate terminal of the second switch device 104 receives a control input from an external source, to control the operation of the second switch device 104.

When the NFC receiver device 30 is powered, the servo loop 66 is enabled, and the gate terminals of the first and second switch devices 102, 104 receive a positive control input, thus switching off the first and second switch devices 102, 104, thereby disabling the control circuit 82 in favour of the servo loop 66. Thus, when the transmit/receive system 36 is powered, the transmit/receive system 36 is protected from potentially damaging overvoltage conditions in the manner described above in relation to the protection system 50 shown in FIG. 2.

When the NFC receiver device 30 is unpowered, the servo loop 66 is disabled (due to the lack of power to the NFC receiver device 30), and the gate terminals of the first and second switch devices 102, 104 receive a control input at 0 volts (again due to the lack of power to the NFC receiver device 30), thus switching on the first and second switch devices 102, 104 to enable the control circuit 82. Thus, when the NFC receiver device 30 is unpowered, the transmit/receive system 36 is protected from potentially damaging overvoltage conditions in the manner described above in relation to the protection system 80 shown in FIG. 4.

In order effectively to limit potentially damaging voltages at the output of the antenna interface 34, the first and second transistors 58, 60 must be capable of sinking or sourcing high currents, which may be as high as 1 Amp or even higher. To achieve this, the first and second transistors 58, 60 must each be very large. The use of the same transistor type for the first and second transistors 58, 60 helps to minimise the area required to implement the first and second transistors 58, 60. Additionally, the same current passes through both of the first and second transistors 58, 60, and there is no DC component to this current. This assists in minimising the area required to implement the protection system 50 in an integrated circuit, as the area of metal interconnection can be minimised because there is little risk of electro-migration.

An interesting feature of the protection systems describe herein is that the protection system 50 can be used without modification to effect load modulation when the NFC receiver device 30 is in a transmit mode.

When used in a transmit mode, the antenna 32 is used to transmit signals, rather than to receive signals as in receive mode. By adjusting the amplitude of the signal applied to the gate terminals of the first and second transistors 58, 60 via the common control input 62, the amplitude of the signal at the output terminals 68, 70 of the antenna interface 34 (which, when the NFC receiver device 30 is in a transmit mode, are used as input terminals for a signal to be transmitted) is modulated. This modulated load can be sensed and decoded by an NFC reader. Thus in this situation the first and second transistors 58, 60, used in conjunction with a controller which is operative to adjust the amplitude of the control signal applied to the gate terminals of the first and second transistors 58, 60 via the common control input 62, for a load modulation system.

The invention claimed is:

1. A near field communications (NFC) device, comprising:
    an antenna including a first antenna terminal and a second antenna terminal;
    a communications circuit; and
    a protection circuit coupled to the antenna and configured to protect the communications circuit from voltages output by the antenna, the protection circuit including a controller comprising:
        a servo loop configured to generate a control signal in a first mode during which the NFC device is powered;
        a plurality of diodes configured to generate the control signal based on the voltages output by the antenna in a second mode during which the NFC device is not powered;
        a first current control device coupled to the first antenna terminal and responsive to the control signal; and
        a second current control device coupled to the second antenna terminal and responsive to the control signal, the protection circuit further configured to either source current to at least one of the first and second antenna terminals or sink current from the at least one of the first and second antenna terminals based on a polarity of an output voltage of the antenna.

2. The NFC device of claim 1, wherein the servo loop is configured to generate the control signal based on a comparison between a sensed peak output voltage of the antenna and a desired peak output voltage.

3. The NFC device of claim 1, wherein the plurality of diodes comprises:
    a plurality of first diodes coupled between the first antenna terminal and a control input of the first current control device; and
    a plurality of second diodes coupled between the second antenna terminal and a control input of the second current control device.

4. The NFC device of claim 3, wherein the controller further comprises a switch device configured to control current flow through the plurality of first diodes and the plurality of second diodes.

5. The NFC device of claim 3, wherein at least the plurality of first diodes are reverse biased when the NFC device is powered on.

6. The NFC device of claim 1, wherein the first and second current control devices comprise transistors.

7. The NFC device of claim 6, wherein the transistors comprise first and second N-channel MOSFETs.

8. The NFC device of claim 7, wherein gate terminals of the first and second N-channel MOSFETs are coupled to each other and to an output of the controller.

9. The NFC device of claim 7, wherein source terminals of the first and second N-channel MOSFETs are coupled to each other.

10. The NFC device of claim 7, wherein a drain terminal of the first N-channel MOSFET is coupled to the first antenna terminal, and a drain terminal of the second N-channel MOSFET is coupled to the second antenna terminal.

11. The NFC device of claim 1, wherein the protection circuit is further configured to:

source current to the first antenna terminal via the first current control device and sink current from the second antenna terminal via the second current control device based on the polarity of the output voltage being positive; and sink current from the first antenna terminal via the first current control device and source current to the second antenna terminal via the second current control device based on the polarity of the output voltage being negative.

12. The NFC device of claim 1, wherein the plurality of diodes is configured to harvest energy from a magnetic field during the second mode.

13. The NFC device of claim 12, wherein the controller further comprises a capacitor configured to store the harvested energy.

* * * * *